United States Patent [19]

Charroppin

[11] Patent Number: 4,823,147
[45] Date of Patent: Apr. 18, 1989

[54] GRAPHIC MACHINE WITH CONTINUOUS STORING DEVICE

[75] Inventor: Pascal Charroppin, Le Vesinet, France

[73] Assignee: Schlumberger Industries, Montrouge Cedex, France

[21] Appl. No.: 154,806

[22] Filed: Feb. 11, 1988

[30] Foreign Application Priority Data

Feb. 16, 1987 [FR] France .................... 87 01957

[51] Int. Cl.$^4$ ................. G01D 15/24; B65H 16/10; B65H 18/10; B65H 20/36
[52] U.S. Cl. ..................... 346/136; 346/1.1; 242/67.3 R
[58] Field of Search .............. 346/1.1, 136; 242/67.3 R

[56] References Cited

U.S. PATENT DOCUMENTS

| Re. 30,422 | 10/1980 | Mourier .................. 346/136 X |
| 4,168,506 | 9/1979 | Corsover .................. 346/136 X |
| 4,477,822 | 10/1984 | Luoma et al. .................. 346/136 |

FOREIGN PATENT DOCUMENTS 0191222 8/1986 European Pat. Off. .
2317030 10/1974 Fed. Rep. of Germany .

OTHER PUBLICATIONS

IBM Technical Disclosure Bulletin Search Report(-France) No. FR 87 01 957.

*Primary Examiner*—George H. Miller, Jr.
*Attorney, Agent, or Firm*—Ladas & Parry

[57] ABSTRACT

A graphic machine or plotter comprising a feed roll (30) for continuously supplying a print medium such as paper (20), driving means (24) for driving the paper supplied by the feed roll to produce a drawing on the paper, and a take-up roll (40) for receiving the paper after the drawing is produced. The feed roll (30) and the take-up roll (40) are linked together in such a way that the rotation of the feed roll (30) in a forward direction for which the paper is payed out from the feed roll drives the take-up roll (40) to wind up the paper but the rotation of the take-up roll (40) in the reverse direction does not drive the feed roll (30).

15 Claims, 3 Drawing Sheets

GRAPHIC MACHINE WITH CONTINUOUS STORING DEVICE

The present invention relates to a graphic machine, and more particularly to a machine of the type comprising a writing device, a feed roll for supplying a continuous print medium, drive means for driving the print medium relative to the writing device, and take-up means for storing the print medium when the drawing has been completed.

The invention relates more particularly to continuously fed X-Y plotters. In such plotters, a drawing is made by relative displacement between the paper and a write head. Generally, the paper is displaced forwardly and backwardly in a longitudinal direction (X), for example by a rotatable drive drum against which the paper is pressed by pressure rollers. The paper may also be driven by a drive drum provided with sprockets that co-operate with perforations formed along the edges of the paper. The write head is moved along a transverse direction (Y) which is perpendicular to the X direction.

In order to make a drawing, an adequate length of paper is payed out from the feed roll by driving the feed roll using a special motor or by exerting traction on the paper using the paper drive means. When a drawing has been completed, a new length of paper is payed out from the feed roll while the length of paper on which printing has taken place is directed towards a take-up device.

With drawing machines that operate automatically, it is common practice to produce several drawings in succession, or even several tens of drawings in succession, without human surveillance. The take-up device must then be designed to store the portion of the paper on which drawings have been made without giving rise to folds or other defects. Proposals have been made to this end to use a take-up roll which is motor driven, thereby requiring a special motor together with means for controlling it appropriately.

An object of the invention is to provide a drawing machine, or more generally a graphic machine, which uses a continuous print medium and which comprises means for storing the printed portion of the print medium in a manner which is simple and cheap, and with said means being easy to integrate in existing machines.

This object is achieved by providing a graphic machine comprising: a rotatable feed roll for supplying a continuous print medium wrapped thereon; means for driving said print medium in a longitudinal direction generally perpendicular to the axis of said feed roll; writing means for producing a drawing on said print medium when said print medium is moved in said longitudinal direction; take-up means for storing said print medium after said drawing is produced on said print medium; and motion transmitting means between said feed roll and said take-up means for driving said take-up means to take up said print medium when said feed roll is rotated in a forward rotational direction for which said print medium is payed out from said feed roll.

No special drive means is required for the take-up means. The take-up means is driven by the feed roll which is driven by the print medium driving means via the print medium when the medium is payed out from the feed roll.

The take-up means may take various different forms. An endless belt or band may be used to drive the print medium by friction and wind the print medium about itself under conditions suitable for avoiding damage thereto.

Preferably, the take-up means comprises a take-up roll onto which the print medium is wound. The transmitting means between the feed roll and the take-up roll is designed to ensure that a length of paper payed out from the feed roll causes a greater length of paper to be wound onto the take-up roll.

The transmitting means between the feed roll and the take-up roll advantageously includes means allowing slippage to occur between the feed roll and the take-up roll when the torque applied to one of said feed roll and take-up roll to the other roll exceeds a predetermined value. These means may be constituted, for example, by a torque limiter.

According to another aspect of the invention, a method of producing a drawing with a graphic machine comprising a feed roll for supplying a continuous print medium, driving means for driving said print medium in forward and reverse longitudinal directions and a take-up roll for receiving said print medium at the output of said driving means, comprises the steps of:

driving said print medium in said forward longitudinal direction for paying out a first length of print medium from said feed roll and for simultaneously winding said print medium on said take-up roll, said first length being greater than the length of drawing to be produced;

driving said print medium in said reverse longitudinal direction for paying out a second length of print medium from said take-up roll, thereby forming a free loop of print medium between said feed roll and said take-up roll, said second length being greater than the length of drawing to be produced;

driving said print medium in said forward and reverse longitudinal directions to produce a drawing on said print medium, said print medium being driven independently from said feed roll and take-up roll due to the free loop of said print medium; and driving said print medium in said forward longitudinal direction for paying out a third length of print medium and simultaneously wind said print medium on said take-up roll thereby storing the previously produced drawing.

The invention will be better understood from the following description given by way of nonlimiting example with reference to the accompanying drawings, in which.

Figure 1:
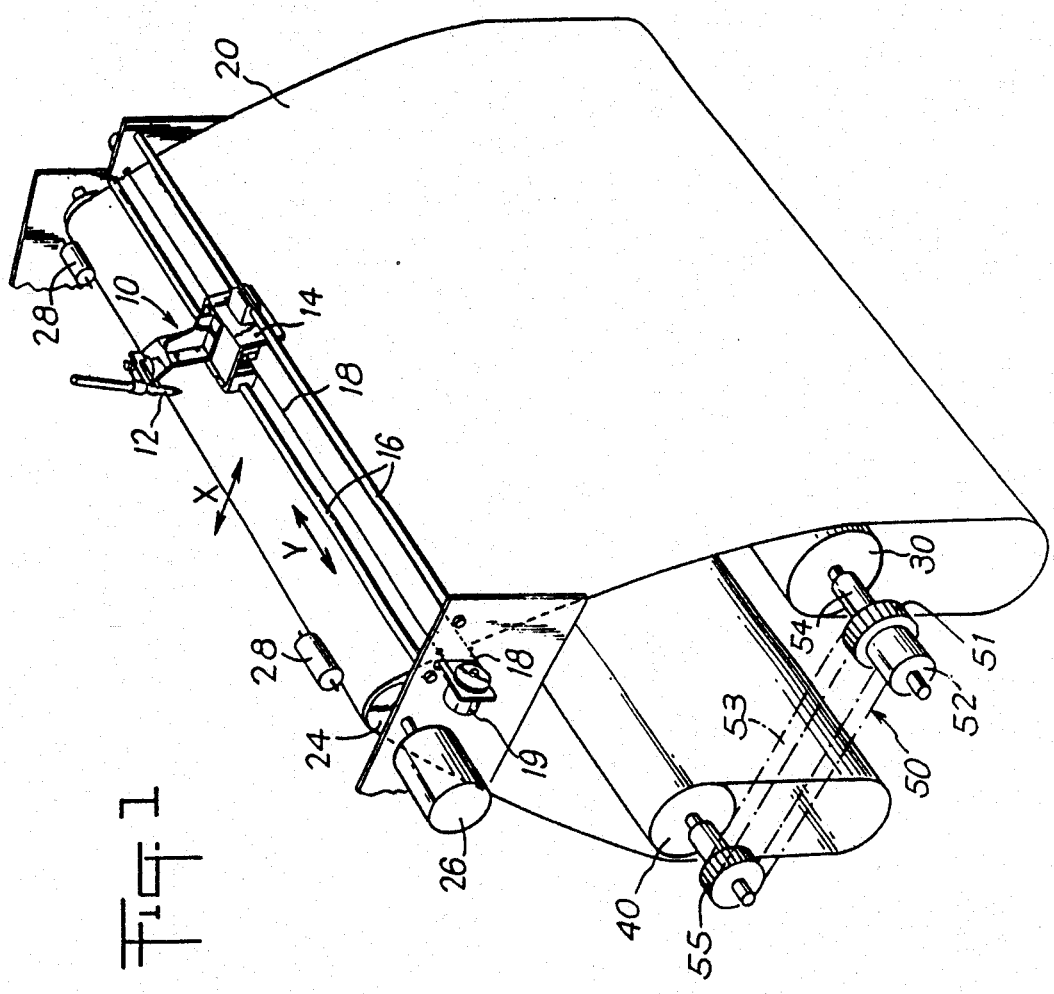
FIG. 1 is a highly diagrammatical overall view of a graphics machine in accordance with the invention.

In a drawing machine as shown in FIG. 1, a line is drawn by relative displacement along two orthogonal axes X and Y between a print or write head 10 carrying a writing tool 12 (a pen, a stylus, or a pencil) and a print medium 20 such as a continuous strip of paper.

Relative to the frame of the machine, the write head 10 is movable in translation along the Y-axis while the print medium is movable along an axis perpendicular to the head displacement path. In the example shown, the write head 10 is carried on a carriage 14 capable of moving along the Y-axis on guides 16 and it is fixed to a transmission member such as an endless cable or belt 18 driven by a motor 19.

The print medium is a continuous strip of paper payed out from a storage roll or feed roll 30 and passing over a drive drum 24 whose axis is parallel to the Y-axis. The drive drum 24 is rotated by means of a motor 26 and the paper is pressed against the drum 24 by means of pressure rollers 28. The zone in which the write member 12 operates is situated in the vicinity of the top generator line of the drive drum 24, with the paper being in contact with a guide surface (not shown).

In accordance with the invention, after it has been drawn on, the paper 20 is received by a moving take-up device 40 which is connected to the feed roll 30 by means of a mechanical transmission 50. In the example shown, the take-up device 40 is constituted by a roll onto which the paper is wound after it has been drawn on.

Figure 2:
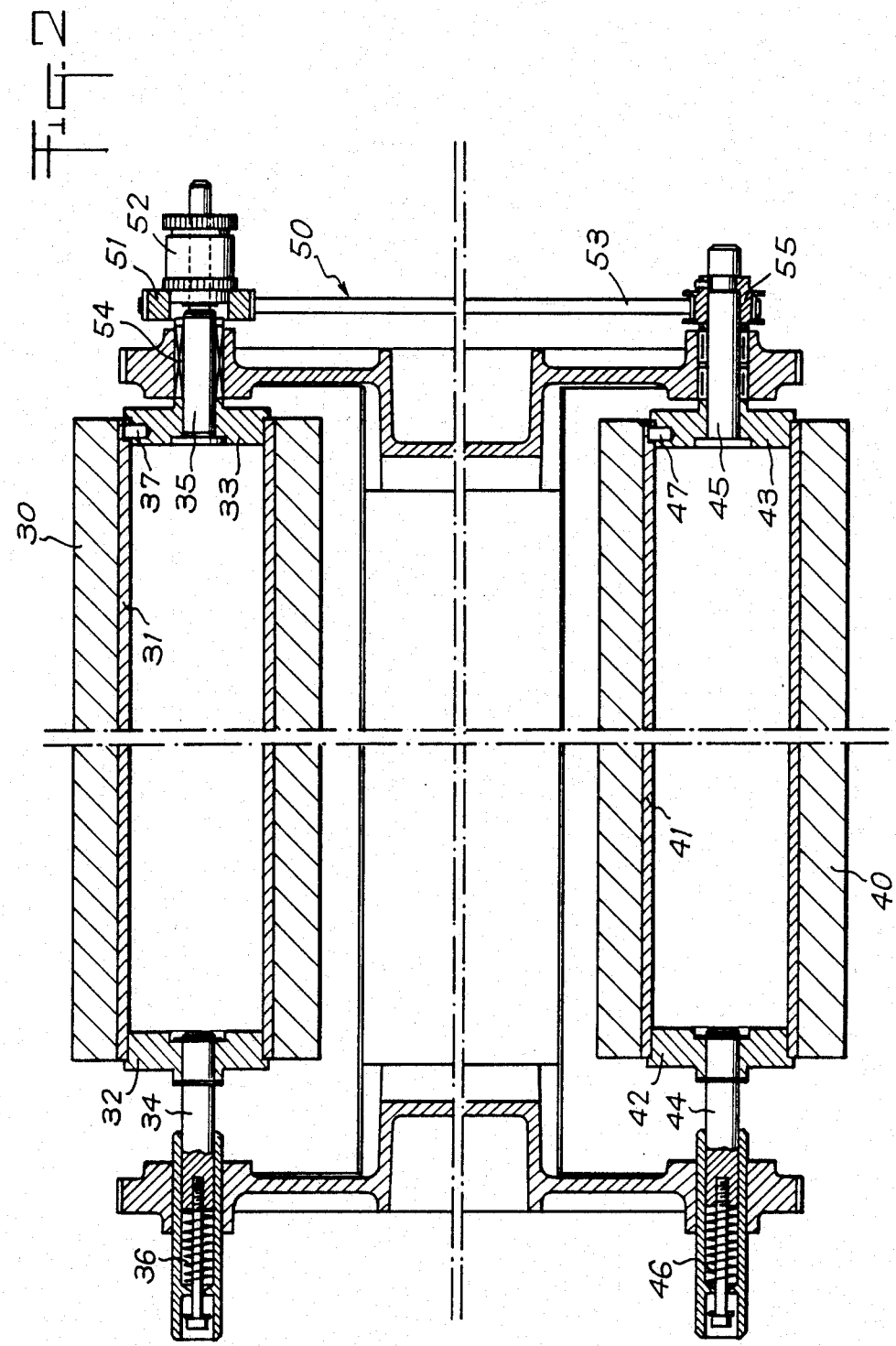
FIG. 2 is a section view showing the feed roll and the take-up roll together with the mechanical transmitting means interposed therebetween in the machine of FIG. 1.
Figure 3:
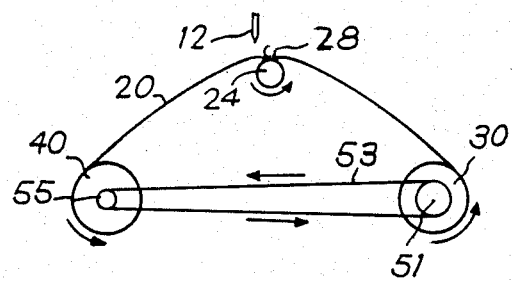
FIGS. 3 to 6 are diagrammatical profile views showing how the FIG. 1 machine operates.

The assembly constituted by the feed roll 30, the take-up roll 40, and the transmission means 50 is shown in greater detail in FIG. 2.

As shown in FIG. 2, the feed roll 30 comprises a mandrel 31 having paper 20 wound thereon. The mandrel 31 is mounted between two end plates 32 and 33. The end plate 32 is free to rotate on a shaft 34 carried by the frame of the machine, while the end plate 33 is fixed to a shaft 35 which is supported by a bearing which forms a part of said frame. In addition, the end plate 32 is axially displaceable against a force exerted by a spring 36 which urges a shoulder of the end plate 32 against the corresponding end of the mandrel 31. The roll can thus be removed or put into place simply by displacing the moving end plate 32 in an axial direction.

The rotary link between the feed roll 30 and the end plate 33 carrying the shaft 35 is provided by means of a transmission pin 37 disposed radially in a housing in the end plate 33 and engaging in a notch formed on the inside of the mandrel 31 and running from the end thereof which is carried on the end plate 33.

In the same way, the take-up roll 40 comprises a mandrel 41 onto which the paper is wound after it has been drawn on. The mandrel 41 is mounted on two end plates 42 and 43, with the end plate 42 rotating on a shaft 44 carried by the frame of the machine, and with the end plate 43 being fixed to a shaft 45 which is supported by a bearing which forms a portion of the frame. The end plate 42 is axially displaceable under the force of a return spring 46, and the rotary connection between the end plate 43 and the mandrel 41 is provided by a transmission pin 47. In a variant, it may be observed that the link between the feed roll and the take-up roll and the end plates on which they are mounted could be provided by means of claw systems carried on the end plates and engaging against the ends of the mandrels.

In accordance with the characteristic of the invention, the take-up roll 40 is driven by the motion of the feed roll 30 as relayed by the mechanical transmission 50, with the feed roll 30 being advantageously rotated by the paper under the action of the drive drum 24. Thus, neither the feed roll nor the take-up roll is motorized.

In the example shown, the transmission means 50 comprises: a toothed wheel 51 which is constrained to rotate with a friction torque limiter 52 mounted on the shaft 35; a toothed gear wheel 55 which is constrained to rotate with the shaft 45; and a toothed belt passing over the wheel 51 and the gear wheel 55. In addition, the shaft 35 is mounted in its bearing by means of a freewheel member 54 so as to prevent the shaft 35 from rotating in the direction opposite to that which corresponds to the paper stored on the feed roll 30 being payed out.

The operation of the above-described machine is now explained with reference to FIGS. 3 to 6, in particular.

When a paper feed roll has been put into place on the end plates 32 and 33, the free edge of the paper is pulled until it can be fixed on the mandrel 41 of the take-up roll 40.

Thereafter, the motor 26 is controlled to rotate the drive drum 24 in the forward direction so as to pay out a length of paper from the roll 30 sufficient for producing a drawing. While the paper is being payed out, the feed roll 30 is rotated by the paper and it in turn rotates the take-up roll by means of the transmission 50. As a result, the paper is wound onto the roll 40 (FIG. 3) at the same time as it is payed out from the feed roll 30.

Figure 4:
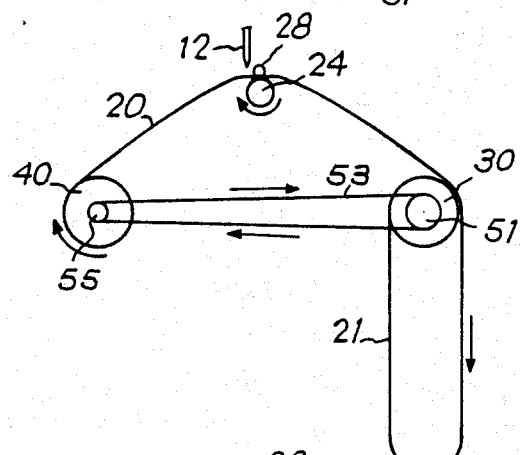

When the necessary length of paper has been payed out, the drive drum 24 is rotated in the reverse direction in order to return at least as far as the starting position. During this reverse rotation of the drum 24, the paper is therefore payed out from the take-up roll 40 onto which it had previously been wound. The take-up roll 40 is rotated in the reverse direction and this motion is transmitted to the gear wheel 55, to the belt 53, and to the toothed wheel 54. However, since the freewheel 54 prevents the feed roll 30 from rotating in the reverse direction, the motion of the toothed wheel 51 is entirely absorbed by the torque limiter "skidding" on the shaft 35. As a result a free loop of paper 21 is formed which is of sufficient length for the drawing to be executed (FIG. 4).

Figure 5:
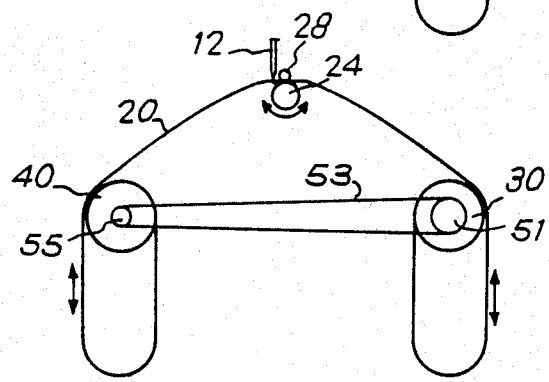

The drawing is performed in conventional manner by controlled displacements of the paper and of the write head. The displacement of the paper along the X-axis in both directions is applicable only to the portion 21 of the paper constituting the free loop (FIG. 5). As a result, while a drawing is being executed, neither of the rolls 30 and 40 is caused to rotate, and such rotation would be particularly unfavorable to drawing speed given the masses that would have to be moved.

It is preferable to form a free loop whose length is greater than the length corresponding to the format of the drawing to be executed in order to provide a margin of free loop whenever the front or rear edge of the format is reached, thereby avoiding coming into abutment with paper that is taut between the writing zone along the front or rear edge, and the take-up roll or the feed roll. To this end, the paper is payed out from the feed roll over a length which is slightly greater than the length of the format, and the reverse run of the paper takes place over a length which is slightly longer than the length payed out.

Figure 6:
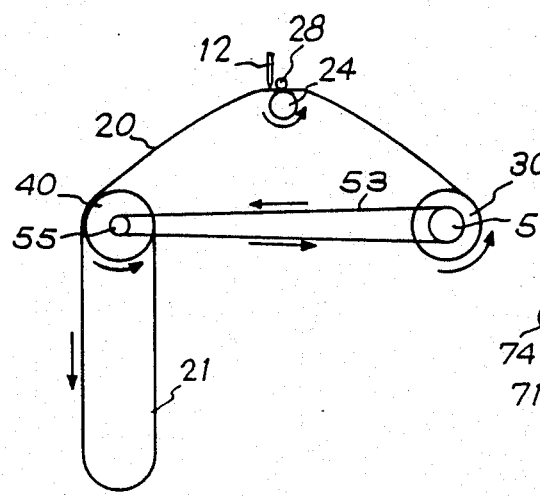

When a drawing has been finished, the motor 26 is caused to drive the drum 24 in the forward direction thereby displacing the paper until the finished drawing is downstream from the write head, in other words until the free loop on which the drawing is to be found is located entirely ahead of the write head (FIG. 6).

A new drawing execution cycle can then be performed, beginning by paying out a new length of paper, with the paying-out causing the portion of the paper bearing the previous drawing to be wound onto the take-up roll.

Given the respective diameters of the rolls 30 and 40, a transmission ratio is selected between these rolls which is sufficient to ensure that at least as much paper is wound onto the take-up roll as the amount which is payed out from the feed roll, and this takes place as soon as the feed roll begins to be used. Preferably, arrangements are made so that a slightly greater length of paper is wound onto the take-up roll then the length which is payed out by selecting a transmission ratio such that the linear winding speed of the paper onto the take-up roll is always greater than the linear speed at which paper is payed out from the feed roll from the beginning to the end of a roll of paper. The torque limiter 52 prevents any jamming which might otherwise take place subsequently, in particular because of the change in the outside diameters of the rolls, which could lead to a configuration during paying-out in which the paper is held taut between the feed roll 30 and the take-up roll 40. The torque limiter 52 then allows for slipping to take place between the shaft 35 and the toothed wheel 51.

In an embodiment of the invention using a feed roll and a take-up roll having mandrels of diameter equal to 58.5 mm, and with a total paper length of 35 m, which corresponds to an initial outside diameter of 92 mm for the full feed roll, the transmission ratio between the take-up roll and the feed roll was selected to be equal to 1.65 (i.e. the take-up roll rotates at a speed which is 1.65 times greater than the speed at which the pay-out roll rotates).

Figure 7:
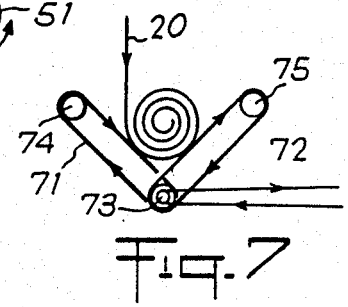
FIG. 7 is a highly diagrammatic illustration of a variant embodiment of a take-up device in a machine in accordance with the invention.

In the above-described machine, the take-up device is essentially constituted by a take-up roll onto which paper is wound after it has been drawn on. Although not preferred, other embodiments of the take-up device could be envisaged. By way of example, as shown in FIG. 7, mention may be made of using two endless transporters 71 and 72 passing over a common roll 73 which is connected to the feed roll by a mechanical transmission, and over two respective return rolls 74 and 75. The transporters 71 and 72 are constituted by parallel belts disposed in alternation around the roll 73 to form the two arms of a V-shape. The paper is brought into contact with the transporters 71 and 72 and winds itself up by virtue of friction drive. It may be noted that in this embodiment there is no need to provide special means for allowing slip between the roll 71 and the feed roll, nor is there any need to provide special means for preventing the feed roll from rotating backwards.

What is claimed is:

1. A graphic machine comprising:
    a rotatable feed roll for supplying a continuous print medium wrapped thereon;
    means for driving said print medium in a longitudinal direction generally perpendicular to the axis of said feed roll;
    writing means for producing a drawing on said print medium when said print medium is moved in said longitudinal direction;
    take-up means for storing said print medium after said drawing is produced on said print medium;
    and motion transmitting means between said feed roll and said take-up means for driving said take-up means to take up said print medium when said feed roll is rotated in a forward rotational direction for which said print medium is payed out from said feed roll.

2. A machine according to claim 1 wherein said feed roll is rotated in said forward direction by forwardly moving said print medium in said longitudinal direction with said driving means.

3. A machine according to claim 1 wherein said transmitting means comprises speed changing means for transmitting the movement of said feed roll to said take-up means in such a way that a length of print medium payed out from said feed roll causes an at least equal length of print medium to be taken up by said take-up means.

4. A machine according to claim 1 wherein said take-up means comprises a rotatably mounted take-up roll having said continuous print medium wrapped thereon, said transmitting means comprising means for rotating said take-up roll in a forward rotational direction for which said print medium is spooled on said take-up roll when said feed roll is rotated in said feed roll forward direction.

5. A machine according to claim 4 wherein said transmitting means between said feed roll and said take-up means comprises one way movement transmitting means for transmitting rotation of said feed roll to said take-up roll when said feed roll is rotated in said feed roll forward direction but not transmitting the rotation of said take-up roll to said feed roll when said take-up roll is rotated in a reverse direction opposite to said take-up roll forward direction.

6. A machine according to claim 5 further comprising means for preventing rotation of said feed roll in a reverse direction opposite said feed roll forward direction.

7. A machine according to claim 6 wherein said transmitting means comprises speed changing means for transmitting the rotation of said feed roll to said take-up roll in such a way that said take-up roll is driven at a rotation speed which is substantially greater than the corresponding rotation speed of said feed roll.

8. A machine according to claim 7 wherein said one-way transmitting means comprises torque limiting means mounted between said feed roll and said take-up roll for allowing slippage to occur between the feed roll and the take-up roll when the torque applied by one of said feed and take-up rolls to the other of said rolls exceeds a predetermined value.

9. A machine according to claim 1 wherein said take-up means comprises transporting means for driving said print medium by friction to wind said print medium about itself.

10. A machine according to claim 9 wherein said transporting means comprises first and second endless belt means having a "V" shaped top surface for receiving said print medium, said first and second belt means being driven by said transmitting means for winding said print medium about itself on said "V" shaped top surface.

11. A graphic machine comprising:
    a rotatable feed roll for supplying a continuous print medium wrapped thereon; means for driving said print medium in a forward and
    reverse longitudinal direction generally perpendicular to the axis of said feed roll;
    writing means movable in a transverse direction relative to said print medium for producing a graphical record on said print medium;
    a take-up roll for receiving said continuous print medium, said driving means being located between said feed roll and said take-up roll; and
    transmitting means between said feed roll and said take-up roll for transmitting rotation from said feed roll to said take-up roll to spool said print medium on said take-up roll when said print medium is unspooled from said feed roll but not transmitting rotation from said take-up roll to said feed roll.

12. A graphic machine according to claim 11, further comprising locking means for preventing rotation of said feed roll in a rotational direction tending to spool said print medium on said feed roll.

13. A graphic machine according to claim 12 wherein said transmitting means comprises torque limiting means located between said feed roll and said take-up roll such that said take-up roll can be rotated in a rotational direction unspooling said print medium from said take-up roll when said feed roll is prevented to rotate in said rotational direction tending to spool said print medium on said feed roll.

14. A method of producing a drawing with a graphic machine comprising a feed roll for supplying a continuous print medium, driving means for driving said print medium in forward and reverse longitudinal directions and a take-up roll for receiving said print medium at the output of said driving means, said method comprising the steps of:
(a) driving said print medium in said forward longitudinal direction for paying out a first length of print medium from said feed roll and for simultaneously winding said print medium on said take-up roll, said first length being greater than the length of drawing to be produced;
(b) driving said print medium in said reverse longitudinal direction for paying out a second length of print medium from said take-up roll, thereby forming a free loop of print medium between said feed roll and said take-up roll, said second length being greater than the length of drawing to be produced;
(c) driving said print medium in said forward and reverse longitudinal directions to produce a drawing on said print medium, said print medium being driven independently from said feed roll and take-up roll due to the free loop of said print medium; and
(d) driving said print medium in said forward longitudinal direction for paying out a third length of print medium and simultaneously wind said print medium on said take-up roll thereby storing the previously produced drawing.

15. A method according to claim 14 further comprising the step of repeating said step b, c, and d each time a drawing is to be produced on a new length of print medium.

* * * * *